(12) United States Patent
Vasudevan

(10) Patent No.: US 8,805,434 B2
(45) Date of Patent: Aug. 12, 2014

(54) ACCESS TECHNIQUES USING A MOBILE COMMUNICATION DEVICE

(75) Inventor: Barathram Vasudevan, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 112 days.

(21) Appl. No.: 12/952,754

(22) Filed: Nov. 23, 2010

(65) Prior Publication Data

US 2012/0129493 A1     May 24, 2012

(51) Int. Cl.
*H04M 1/00*              (2006.01)

(52) U.S. Cl.
USPC ........................ 455/550.1; 340/3.32; 345/174

(58) Field of Classification Search
USPC ........................................................ 455/550.1
See application file for complete search history.

(56) References Cited

U.S. PATENT DOCUMENTS

| | | | |
|---|---|---|---|
| 5,394,609 A | 3/1995 | Ferguson et al. | |
| 5,533,123 A | 7/1996 | Force et al. | |
| 5,590,038 A | 12/1996 | Pitroda | |
| 5,878,400 A | 3/1999 | Carter, III | |
| 5,953,710 A | 9/1999 | Fleming | |
| 5,987,425 A | 11/1999 | Hartman et al. | |
| 6,061,660 A | 5/2000 | Eggleston et al. | |
| 6,088,451 A * | 7/2000 | He et al. ............................ | 726/8 |
| 6,102,287 A | 8/2000 | Matyas, Jr. | |
| 6,372,331 B1 | 4/2002 | Terada et al. | |
| 6,615,171 B1 | 9/2003 | Kanevsky et al. | |
| 6,711,263 B1 | 3/2004 | Nordenstam et al. | |
| 6,754,833 B1 | 6/2004 | Black et al. | |
| 6,766,454 B1 | 7/2004 | Riggins | |
| 6,883,718 B1 | 4/2005 | Le et al. | |
| 6,932,270 B1 | 8/2005 | Fajkowski | |
| 7,257,545 B1 | 8/2007 | Hung | |
| 7,437,329 B2 | 10/2008 | Graves | |
| 7,463,898 B2 | 12/2008 | Bayne | |

(Continued)

FOREIGN PATENT DOCUMENTS

| | | |
|---|---|---|
| CN | 1502186 | 6/2004 |
| CN | 1589424 | 3/2005 |

(Continued)

OTHER PUBLICATIONS

Alvarez, Mark, "Apple's iKey Will Put Your House Keys on Your Phone", Retrieved at << http://www.atelier-us.com/mobile-wireless/article/apples-ikey-will-put-your-house-keys-on-your-phone >>,Mar. 9, 2010, pp. 1-2.

(Continued)

*Primary Examiner* — Ajibola Akinyemi
(74) *Attorney, Agent, or Firm* — Aaron Chatterjee; Andrew Sanders; Micky Minhas

(57) ABSTRACT

Access techniques using a mobile communication device are described. In implementations, a mobile communication device comprises a processor, hardware configured to implement multi-mode wireless communication in which at least one of the modes involves telephone communication, tamper-resistant hardware implementing a secure element as storing one or more credentials, and memory having instructions stored therein. The instructions are executable by the processor to cause the mobile communication device to perform operations comprising forming a communication having data that was generated using the one or more credentials stored in the secure element, the communication to be transmitted wirelessly using the hardware implementing the multi-mode wireless communication to initiate function of a physical lock or vehicle.

15 Claims, 6 Drawing Sheets

(56) References Cited

U.S. PATENT DOCUMENTS

| | | | |
|---|---|---|---|
| 7,600,676 B1 | 10/2009 | Rados | |
| 7,628,322 B2 | 12/2009 | Holtmanns et al. | |
| 7,647,243 B2 | 1/2010 | Woolston | |
| 7,647,430 B2 | 1/2010 | Ng et al. | |
| 7,769,633 B2 | 8/2010 | Jokinen | |
| 7,774,238 B2 | 8/2010 | Gopalpur et al. | |
| 7,805,379 B1 | 9/2010 | Adkins, III et al. | |
| 7,840,494 B2 | 11/2010 | Wiederin | |
| 7,996,331 B1 | 8/2011 | Solanki et al. | |
| 2001/0042010 A1 | 11/2001 | Hassell | |
| 2002/0065713 A1 | 5/2002 | Awada | |
| 2002/0087876 A1 | 7/2002 | Larose | |
| 2002/0123938 A1 | 9/2002 | Yu et al. | |
| 2002/0146125 A1 | 10/2002 | Eskicioglu et al. | |
| 2002/0150243 A1 | 10/2002 | Craft et al. | |
| 2003/0028469 A1 | 2/2003 | Bergman et al. | |
| 2003/0061111 A1 | 3/2003 | Dutta et al. | |
| 2003/0132284 A1 | 7/2003 | Reynolds et al. | |
| 2003/0204726 A1 | 10/2003 | Kefford et al. | |
| 2003/0208403 A1 | 11/2003 | Fisher et al. | |
| 2004/0068649 A1 | 4/2004 | Haller et al. | |
| 2004/0128197 A1 | 7/2004 | Bam et al. | |
| 2004/0193485 A1 | 9/2004 | Ilberg | |
| 2004/0206812 A1 | 10/2004 | Tamagno et al. | |
| 2004/0247115 A1 | 12/2004 | Ono et al. | |
| 2005/0015401 A1 | 1/2005 | Chang et al. | |
| 2005/0021982 A1* | 1/2005 | Popp et al. | 713/184 |
| 2005/0111463 A1 | 5/2005 | Nepomuceno Leung et al. | |
| 2005/0125451 A1 | 6/2005 | Mooney | |
| 2005/0137889 A1 | 6/2005 | Wheeler et al. | |
| 2005/0137939 A1 | 6/2005 | Calabria et al. | |
| 2005/0154909 A1 | 7/2005 | Zhang et al. | |
| 2005/0157872 A1 | 7/2005 | Ono et al. | |
| 2005/0187873 A1 | 8/2005 | Labrou et al. | |
| 2005/0256778 A1 | 11/2005 | Boyd et al. | |
| 2005/0289047 A1 | 12/2005 | Oliver et al. | |
| 2006/0090081 A1* | 4/2006 | Baentsch et al. | 713/189 |
| 2006/0091223 A1 | 5/2006 | Zellner et al. | |
| 2006/0179309 A1 | 8/2006 | Cross et al. | |
| 2006/0213972 A1 | 9/2006 | Kelley et al. | |
| 2006/0236363 A1 | 10/2006 | Heard et al. | |
| 2007/0038523 A1 | 2/2007 | Komem et al. | |
| 2007/0043636 A1 | 2/2007 | Foster | |
| 2007/0095927 A1 | 5/2007 | Pesonen et al. | |
| 2007/0107050 A1 | 5/2007 | Selvarajan | |
| 2007/0156555 A1 | 7/2007 | Orr | |
| 2007/0180276 A1 | 8/2007 | Everett et al. | |
| 2007/0190939 A1 | 8/2007 | Abel | |
| 2007/0197261 A1 | 8/2007 | Humbel | |
| 2007/0235539 A1 | 10/2007 | Sevanto et al. | |
| 2007/0254712 A1 | 11/2007 | Chitti | |
| 2007/0278291 A1 | 12/2007 | Rans | |
| 2008/0011837 A1 | 1/2008 | Wesley | |
| 2008/0039134 A1 | 2/2008 | Hattori et al. | |
| 2008/0052233 A1 | 2/2008 | Fisher et al. | |
| 2008/0116264 A1 | 5/2008 | Hammad et al. | |
| 2008/0126145 A1 | 5/2008 | Rackley, III et al. | |
| 2008/0189192 A1 | 8/2008 | Ronen et al. | |
| 2008/0208741 A1 | 8/2008 | Arthur et al. | |
| 2008/0215636 A1 | 9/2008 | Lofgren et al. | |
| 2008/0248815 A1 | 10/2008 | Busch | |
| 2008/0255942 A1 | 10/2008 | Craft | |
| 2008/0262928 A1 | 10/2008 | Michaelis | |
| 2008/0270251 A1 | 10/2008 | Coelho et al. | |
| 2008/0280644 A1* | 11/2008 | Hugot | 455/556.2 |
| 2008/0309451 A1* | 12/2008 | Zellweger et al. | 340/3.32 |
| 2009/0036103 A1 | 2/2009 | Byerley et al. | |
| 2009/0037287 A1 | 2/2009 | Baitalmal et al. | |
| 2009/0097637 A1 | 4/2009 | Boscher et al. | |
| 2009/0191811 A1 | 7/2009 | Griffin et al. | |
| 2009/0192937 A1 | 7/2009 | Griffin et al. | |
| 2009/0193264 A1 | 7/2009 | Fedronic | |
| 2009/0198997 A1 | 8/2009 | Yeap et al. | |
| 2009/0205028 A1 | 8/2009 | Smeets et al. | |
| 2009/0234861 A1 | 9/2009 | Ramer et al. | |
| 2009/0265555 A1 | 10/2009 | Royer | |
| 2009/0270045 A1 | 10/2009 | Flaherty | |
| 2009/0271850 A1 | 10/2009 | Hoppe et al. | |
| 2009/0281947 A1 | 11/2009 | Erel | |
| 2009/0307132 A1 | 12/2009 | Phillips | |
| 2009/0312011 A1 | 12/2009 | Huomo et al. | |
| 2009/0325565 A1 | 12/2009 | Backholm | |
| 2010/0010994 A1 | 1/2010 | Wittig et al. | |
| 2010/0042954 A1 | 2/2010 | Rosenblatt et al. | |
| 2010/0048226 A1 | 2/2010 | Owen et al. | |
| 2010/0049599 A1 | 2/2010 | Owen et al. | |
| 2010/0057573 A1 | 3/2010 | Singhal | |
| 2010/0069096 A1 | 3/2010 | Poola | |
| 2010/0070364 A1 | 3/2010 | Dugan | |
| 2010/0106583 A1 | 4/2010 | Etheredge et al. | |
| 2010/0125495 A1 | 5/2010 | Smith et al. | |
| 2010/0125510 A1 | 5/2010 | Smith et al. | |
| 2010/0146119 A1 | 6/2010 | Lee | |
| 2010/0153447 A1 | 6/2010 | Johnson et al. | |
| 2010/0163618 A1 | 7/2010 | Yang et al. | |
| 2010/0174598 A1 | 7/2010 | Khan et al. | |
| 2010/0317336 A1* | 12/2010 | Ferren et al. | 455/419 |
| 2011/0078773 A1 | 3/2011 | Bhasin et al. | |
| 2011/0305337 A1 | 12/2011 | Devol et al. | |
| 2012/0084138 A1 | 4/2012 | Anantha | |
| 2012/0089404 A1 | 4/2012 | Rao | |
| 2012/0089450 A1 | 4/2012 | Anantha | |
| 2012/0099727 A1 | 4/2012 | Marshall | |
| 2012/0109771 A1 | 5/2012 | Zargahi | |
| 2012/0143669 A1 | 6/2012 | Anantha | |
| 2012/0143758 A1 | 6/2012 | Anantha | |
| 2012/0143769 A1 | 6/2012 | Krishnan | |
| 2012/0144201 A1 | 6/2012 | Anantha | |
| 2012/0196529 A1 | 8/2012 | Huomo et al. | |
| 2013/0138571 A1* | 5/2013 | Vassilev et al. | 705/71 |

FOREIGN PATENT DOCUMENTS

| | | |
|---|---|---|
| CN | 1645791 | 7/2005 |
| CN | 1934545 | 3/2007 |
| CN | 1947343 | 4/2007 |
| CN | 101341517 | 1/2009 |
| KR | 20070092773 | 9/2007 |
| KR | 20070120125 | 12/2007 |
| KR | 20080006694 | 1/2008 |
| WO | WO-2006031202 | 3/2006 |
| WO | WO-2010039337 | 4/2010 |
| WO | WO-2010079483 | 7/2010 |

OTHER PUBLICATIONS

Jamardo et al., "Touch Computing: Simplifying Human to Environment Interaction through NFC Technology", Retrieved at<< http://paginaspersonales.deusto.es/dipina/publications/dipinaJornadasRFID-NFC.pdf >>,Nov. 21-23, 2007, pp. 12.

"Mobile Phones to Open Doors: Philips and SK Telecom Launch NFC RFID Trial in Seoul", Retrieved at << http://www.itu.int/ITU-D/cyb/newslog/Mobile+Phones+to+Open+Doors+Philips+And+SK+Telecom+Launch+NFC+RFID+Trial+In+Seoul.aspx >>,May 27, 2006, pp. 1-3.

Clark Sarah., "Orange and Valeo demonstrate NFC car key concept",Retrieved at << http://www.nearfieldcommunicationsworld.com/2010/10/07/34592/orange-and-valeo-demonstrate-nfc-car-key-concept/ >>, Oct. 7, 2010, p. 1.

"Future iPhoneto Unlock doors", Retrieved at << http://top10.com/mobilephones/news/2010/03/iphone_to_unlock_doors/ >>,Mar. 10, 2010, pp. 3.

"Car Key", Retrieved at << http://www.autofocusasia.com/electrical_electronics/car_key_tody.htm >>, —Retrieved Date: Oct. 19, 2010, pp. 1-5.

"Contactless Loyalty Scheme Gets Boost From Deal with Acquirer", Retrieved from: <http://www.nfctimes.com/news/contactless-loyalty-scheme-gets-boost-deal-acquirer> on Oct. 20, 2010, (Aug. 17, 2010), 7 pages.

"Download Blaze Mobile Wallet for Mobile", Retrieved from: <http://www.getjar.com/mobile/18367/blaze-mobile-wallet/> Oct. 19, 2010, (Jan. 28, 2010), 2 pages.

(56) References Cited

OTHER PUBLICATIONS

"FidBook, the first NFC application enabling easy-load loyalty cards on a NFC phone is launched in Nice.", Retrieved from: <http://krowne.wordpress.com/2010/06/04/fidbook-the-first-nfc-application-enabling-easy-load-loyalty-cards-on-a-nfc-phone-is-launched-in-nice/> on Oct. 22, 2010, (Jun. 4, 2010), 6 pages.
"Final Office Action", U.S. Appl. No. 12/909,178, (Dec. 10, 2012), 10 pages.
"Final Office Action", U.S. Appl. No. 12/958,773, (Aug. 29, 2012), 21 pages.
"Financial Forecast Center", Retrieved from: <http://www.forecasts.org/exchange-rate/> on Aug. 29, 2012, 4 pages.
"FireID Launches Mobile Two-Factor Authentication Platform For Online And Mobile Banking", available at <http://www.darkreading.com/insiderthreat/security/client/showArticle.jhtml?articleID=223900289> (Mar. 17, 2010), 3 pages.
"Fresh Ideas for Building Profitable Customer Relationships", Retrieved from: <http://www.customerinsightgroup.com/loyaltyblog/> on Aug. 27, 2010, (Aug. 18, 2010),16 pages.
"G&D's New Card Innovation on Display", Retrieved from: <http://www.gi-de.com/pls/portal/maia.display_custom_items.DOWNLOAD_FILE_BLOB?p_ID=139208&p_page_id=123329&p_pg_id=44> on Oct. 22, 2010, (2007), pp. 1-12.
"Get Mobile Coupons Through Your Android Phone With Local Search", available at <http://androidandme.com/2009/11/news/get-mobile-coupons-through-your-android-phone-with-local-search/>, (Nov. 24, 2009), 7 pages.
"GoMo Mobile Wallet", Retrieved from: <http://www.marketwire.com/press-release/GoMo-Wallet-Delivers-New-Class-Mobile-Commerce-Functionality-That-Changes-Transaction-1276550.htm> on Oct. 19, 2010, (Jun. 15, 2010), 2 pages.
"MobileID: A Mobile, Two-Way and Two-Factor Authentication", available at <http://www.deepnetsecurity.com/products2/mobileid.asp>, (2010), 2 pages.
"MobiQpons launches Free Service for Small Businesses to increase loyalty and repeat customers", Retrieved from: <http://www.prlog.org/10696328-mobiqpons-launches-free-service-for-small-businesses-to-increase-loyalty-and-repeat-customers.html> on Oct. 20, 2010, (May 24, 2010), 2 pages.
"Non-Final Office Action", U.S. Appl. No. 12/898,131, (Jan. 4, 2013), 25 pages.
"Non-Final Office Action", U.S. Appl. No. 12/898,131, (Feb. 14, 2013), 24 pages.
"Non-Final Office Action", U.S. Appl. No. 12/899,861, (Jan. 7, 2013), 22 pages.
"Non-Final Office Action", U.S. Appl. No. 12/909,178, (Aug. 3, 2012),12 pages.
"Non-Final Office Action", U.S. Appl. No. 12/917,178, (Sep. 12, 2012), 36 pages.
"Non-Final Office Action", U.S. Appl. No. 12/917,196, (Nov. 5, 2012), 24 pages.
"Non-Final Office Action", U.S. Appl. No. 12/958,173, (Dec. 19, 2012), 10 pages.
"Non-Final Office Action", U.S. Appl. No. 12/958,773, (Jul. 27, 2012), 18 pages.
"Non-Final Office Action", U.S. Appl. No. 12/958,841, (Jan. 9, 2013), 24 pages.
"PCT Search Report and Written Opinion", Application No. PCT/US2011/052782, (Mar. 27, 2012), 11 pages.
"PCT Search Report and Written Opinion", Application No. PCT/US2011/061731, (May 10, 2012), 9 pages.
"PDA Phone Smartcard-reader combines Contact and Contactless technology & transfer data via GPRS", *Fifth Media Sdn. Bhd.*, Available at <http://www.fifthmedia.biz/NFC07.pdf>,(2009), 2 pages.
"Proximity Mobile Payments: Leveraging NFC and the Contactless Financial Payments Infrastructure", *Smart Card Alliance White Paper*, Available at <http://www.smartcardalliance.org/resources/lib/Proximity_Mobile_Payments_200709.pdf>,(Sep. 2007), 39 pages.
"Publishing Your Applications", Retrieved from: <http://developer.android.com/guide/publishing/publishing.html> on Sep. 6, 2010, (Aug. 23, 2010), 4 pages.
"Restriction Requirement", U.S. Appl. No. 12/958,773, (Jun. 7, 2012), 6 pages.
"Roamware's Macalla Platform", *Roamware, Inc.*, Available at <http://www.mobilemoneyexchange.org/Files/242ee787>,(Nov. 2009), 2 pages.
"Security Issues in the Context of Authentication Using Mobile Devices (Mobile eID)", available at <http://www.enisa.europa.eu/act/it/eid/mobile-eid/at_download/fullReport>, (Nov. 2008), 24 pages.
"Simfonie Mobile Payments", *GFG Group*, Available at <http://www.gfg-group.com/downloads/gfg_simfonie_product_brochure.pdf>,(2010), 4 pages.
"Smart Cards (Flexible Display)", Retrieved from: <http://www.citala.com/index.php/Application-Solutions/Smart-Cards.html> on Oct. 22, 2010, 2 pages.
"Starbucks Card Mobile App", Retrieved from <http://web.archive.org/web/20100303042234/http://www.starbucks.com/coffeehouse/mobileapps/starbucks-card-mobile> on Dec. 19, 2012, (Mar. 2, 2010), 9 pages.
"The Bump App for iPhone and Android", Retrieved from: <http://bu.mp/> on Oct. 28, 2010, Bump Technologies, Inc.,(2010), 1 page.
"The Mobile Wallet", *Quirk eMarketing, Mobile Marketing 101, Chapter 9*, Available at <http://www.quirk.biz/cms/3259.quirk_emarketing_mobile_marketing101_ch9.pdf>,(Oct. 19, 2010), pp. 1-10.
"Transfer pricing", Retrieved from: <http://www.deloitte.com/view/en_NZ/nz/services/tax-services/transfer-pricing/> on Oct. 12, 2010, (2010), 2 pages.
"ViVOtech Launches ViVOpay 8100—A Cost Effective PCI 2.1-Certified PIN pad, Mobile Loyalty, Mag-Stripe & NFC Payment Device for Small and Medium Sized Merchants", Retrieved from: <http://www.smartcardalliance.org/articles/2010/04/13/vivotech-launches-vivopay-8100-a-cost-effective-pci-2-1-certified-pin-pad-mobile-loyalty-mag-stripe-nfc-payment-device-for-small-and-medium-sized-merchants> on Oct. 20, 2010, (Apr. 13, 2010), 2 pages.
"Zinio Introduces International Pricing Management System for Publishers and their Global Licensees", Retrieved from: <http://in.zinio.com/press/press-release.jsp?pressreleaseid=pr148100> on Oct. 12, 2010, (Sep. 17, 2010), 2 pages.
Benson, Carol C., "Wallets and Stickers and Phones, Oh My!—A Look at Blaze Mobile", Retrieved from: <http://paymentsviews.com/2009/07/15/blaze-mobile/> on Aug. 27, 2010 (Jul. 15, 2009), 7 pages.
Billich, Christopher "The insider's Guide to Mobile Web Marketing in Japan", Retrieved from: <http://mobithinking.com/guide-mobile-Web-Japan> on Aug. 27, 2010, (2010), 6 pages.
Clark, Sarah "Canadian mobile operators 'plan to introduce NFC or contactless handsets within the year", Retrieved from: <http://www.nearfieldcommunicationsworld.com/2010/02/17/32839/canadian-mobile-operators-plan-to-introduce-nfc-or-contactless-handsets-within-the-year/> on Oct. 19, 2010, (Feb. 17, 2010), 3 pages.
Conneally, Tim "Windows Phone Marketplace to include private app distribution, shareware modes", Retrieved from: <http://www.betanews.com/article/Windows-Phone-Marketplace-to-include-private-app-distribution-shareware-modes/1276026026> on Sep. 6, 2010 (Jun. 8, 2010), 1 page.
Cooke, John "Flexible display in your smart card anyone?", Retrieved from: <http://www.cocatalyst.com/blog/index.php/2008/06/28/flexible-display-in-your-smart-card-anyone/> on Oct. 22, 2010, (Jun. 28, 2008), 4 pages.
Davies, Chris "MasterCard trialling smart credit cards with display & keypads", Retrieved from: <http://gigaom.com/2010/08/20/visa-testing-nfc-memory-cards-for-wireless-payments/> on Oct. 22, 2010, (Aug. 20, 2008), 12 pages.
Ekberg, Jan-Erik et al., "On-board Credentials with Open Provisioning", *NOKIA Research Center*, NRC-TR-2008-007, Available at <http://research.nokia.com/files/NRCTR2008007.pdf>,(Aug. 29, 2008), 18 pages.

(56) References Cited

OTHER PUBLICATIONS

Hardawar, Devindra "Verizon bets $400K on mobile loyalty card startup CardStar", Retrieved from: <http://www.reuters.com/article/idUS388514646320100821> on Oct. 20, 2010 (Aug. 21, 2010), 3 pages.

Kats, Rimma "Mobile Spinach introduces mobile coupons that never expire", Retrieved from: <http://www.mobilecommercedaily.com/mobile-spinach-introduces-mobile-coupons-that-do-not-expire/> on Oct. 20, 2010, (Jun. 8, 2010), 2 pages.

Kaviani, Nima et al., "A Two-factor Authentication Mechanism Using Mobile Phones", available at <http://lersse-dl.ece.ubc.ca/record/163/files/163.pdf>, Laboratory for Education and Research in Secure Systems Engineering, University of British Columbia, Technical report LERSSE-TR-2008-03,(Aug. 20, 2008), 27 pages.

Klenk, Andreas et al., "Preventing Identity Theft with Electronic Identity Cards and the Trusted Platform Module", available at <http://www.netin.tum.de/fileadmin/bibtex/publications/papers/klenk_eurosec2009.pdf>, (Mar. 2009), 8 pages.

Maguire, Adam "Deal paves way for customer loyalty schemes", Retrieved from: <http://www.irishtimes.com/newspaper/finance/2010/0813/1224276713080.html> on Oct. 20, 2010 (Aug. 13, 2010), 6 pages.

McCarthy, Barry "The Risks and Opportunities in a Mobile Commerce Economy", *A First Data White Paper*, Available at <http://www.star-systems.com/downloads/thought-leadership/fd_mobilecommerceoverview_whitepaper.pdf>,(2008), 13 pages.

Nash, Kim S., "Follow the Money", *Nash, Kim S., Follow the Money*, Dec. 1, 2009, pp. 26-32, (Dec. 1, 2009), 6 pages.

Okoegwale, Emmanuel "Mobile Money Service Provider Profiles", Retrieved from: <http://www.developingtelecoms.com/mobile-money-service-provider-profiles.html> on Oct. 19, 2010, (Jun. 25, 2009), 5 pages.

Olsen, Richard "Pricing in the FX Marketplace©", *Olsen Ltd.*, Available at <http://mediaserver.fxstreet.com/Reports/ec6a8d2d-bbb6-412f-90f7-8a91ce0716f7/0a1df9c0-187f-4151-9785-5ef8ff4467cd.pdf>,(May 21, 2010), pp. 1-8.

Shankar, Venkatesh et al., "Mobile Marketing in the Retailing Environment: Current Insights and Future Research Avenues", *The Journal of Interactive Marketing—Draft*, available at <http://www.crito.uci.edu/papers/2010/MobileMarketing.pdf>,(Feb. 2010), pp. 1-29.

Whitney, Lance "Apple files patent for Passbook coupons with a touch of NFC", downloaded at >>http://news.cnet.com/8301-13579_3-57560263-37/apple-files-patent-for-passbook-coupons-with-a-touch-of-nfc/<< on Dec. 21, 2012, (Dec. 20, 2012), 2 pages.

Wray, Jeffrey A., "Mobile Advertising Engine", *A Senior Research Paper, Stetson University, Spring Term 2009*, available at <http://www2.stetson.edu/mathcs/people/students/research/pdf/2008/jwray/final.pdf>,(2009), 52 pages.

Ziegler, Chris "Windows Phone Marketplace for Windows Phone 7 Series unveiled", Retrieved from: <http://www.engadget.com/2010/03/15/windows-phone-marketplace-for-windows-phone-7-series-unveiled/> on Sep. 6, 2010. (Mar. 15, 2010), 3 pages.

"Final Office Action", U.S. Appl. No. 12/898,131, (Apr. 12, 2013), 31 pages.

"Final Office Action", U.S. Appl. No. 12/899,861, (May 10, 2013), 27 pages.

"Final Office Action", U.S. Appl. No. 12/917,178, (Mar. 26, 2013), 37 pages.

"Final Office Action", U.S. Appl. No. 12/917,196, (May 15, 2013), 31 pages.

"Final Office Action", U.S. Appl. No. 12/958,173, (Jun. 4, 2013), 15 pages.

"Final Office Action", U.S. Appl. No. 12/958,841, (May 24, 2013), 24 pages.

"My Starbucks Rewards—Examiner's Digital Loyalty Reward Account Summary", Retrieved from <http://www.starbucks.com/account/rewards> on Apr. 24, 2013,1 page.

"My Starbucks Rewards", Retrieved from <http://web.archive.org/web/20101130202420/https://www.starbucks.com/card/rewards> on May 24, 2013, (Nov. 30, 2010),11 pages.

"Non-Final Office Action", U.S. Appl. No. 12/959,715, (Apr. 1, 2013),19 pages.

"Ex Parte Quayle Action", U.S. Appl. No. 12/958,173, (Aug. 29, 2013), 5 pages.

"Final Office Action", U.S. Appl. No. 12/959,715, (Aug. 28, 2013), 26 pages.

"Non-Final Office Action", U.S. Appl. No. 12/899,861, (Aug. 15, 2013), 30 pages.

"Non-Final Office Action", U.S. Appl. No. 12/917,178, (Jul. 25, 2013), 39 pages.

"Foreign Office Action", CN Application No. 201110392619.8, Nov. 5, 2013, 12 Pages.

"Foreign Office Action", CN Application No. 201110314187.9, Dec. 19, 2013, 13 pages.

"Foreign Office Action", CN Application No. 201110340395.6, Nov. 22, 2013, 15 Pages.

"Non-Final Office Action", U.S. Appl. No. 12/958,841, Nov. 7, 2013, 25 pages.

"Ex Parte Quayle Action", U.S. Appl. No. 12/958,173, Jan. 3, 2014, 4 pages.

"Foreign Office Action", CN Application No. 201110310747.3, Jan. 8, 2014, 12 Pages.

"Foreign Office Action", CN Application No. 201110415260.1, Feb. 11, 2014, 17 Pages.

"Final Office Action", U.S. Appl. No. 12/899,861, Feb. 14, 2014, 30 pages.

"Final Office Action", U.S. Appl. No. 12/917,178, Feb. 11, 2014, 45 pages.

"Non-Final Office Action", U.S. Appl. No. 12/958,173, Apr. 23, 2014, 10 pages.

"Final Office Action", U.S. Appl. No. 12/958,841, May 8, 2014, 26 pages.

"Non-Final Office Action", U.S. Appl. No. 12/898,131, May 13, 2014, 29 pages.

\* cited by examiner

400

402
Form a communication having data generated using one or more credentials stored in a secure element of a mobile communication device

404
Transmit the communication wirelessly to initiate function of a physical lock or vehicle

502
Verify data received wirelessly and directly from a mobile communication device having telephone functionality to determine whether function of a physical lock or vehicle is authorized, the data generated by the mobile communication device using one or more credentials stored within a secure element implemented using tamper-resistant hardware in the mobile communication device

504
Responsive to verification that the function is authorized, initiate performance of the function

506
Perform the function

ACCESS TECHNIQUES USING A MOBILE COMMUNICATION DEVICE

BACKGROUND

Mobile communication devices such as wireless phones have become a common part in the everyday life of a wide variety of users. Indeed, the mobile communications device may serve as a primary point of contact for a variety of business and personal uses. For example, a business user may utilize the mobile communications device to receive email, a casual user may send text messages to friends, and so on.

However, traditional techniques that were employed to securely store data on the mobile communications device as well as to communicate data to the mobile communications device could result in the data being "in the clear." Even if but for a brief moment in time, malicious parties may take advantage of this to steal sensitive data. This may even result in the ability by the malicious party to access other information on the mobile communications device itself. Consequently, functionality of the mobile communications device may be limited from meeting its true potential due to the ability to compromise the mobile communications device.

SUMMARY

Access techniques using a mobile communication device are described. In one or more implementations, a mobile communication device comprises a processor, hardware configured to implement multi-mode wireless communication in which at least one of the modes involves telephone communication, tamper-resistant hardware implementing a secure element as storing one or more credentials, and memory having instructions stored therein. The instructions are executable by the processor to cause the mobile communication device to perform operations comprising forming a communication having data that was generated using the one or more credentials stored in the secure element, the communication to be transmitted wirelessly using the hardware implementing the multi-mode wireless communication to initiate function of a physical lock or vehicle.

In one or more implementations, data is verified that is received wirelessly and directly from a mobile communication device having telephone functionality to determine whether function of a physical lock or vehicle is authorized, the data generated by the mobile communication device using one or more credentials stored within a secure element implemented using tamper-resistant hardware in the mobile communication device. Responsive to verification that the function is authorized, performance of the function is initiated.

In one or more implementations, credentials are provisioned on a secure element implemented in tamper-resistant hardware of a mobile communication device having telephone functionality using a public key to encrypt the credentials for communication to the mobile communication device. The secure element is configured to decrypt the encrypted credentials using a corresponding private key stored within the secure element without exposing the credentials or the private key outside of the secure element. A communication is formed for transmission by the mobile communication device that includes data that describes an operation to be performed by a vehicle and data generated using the provisioned credentials that is usable to verify that the mobile communication device is authorized to cause the operation to be performed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 4 is a flow diagram depicting a procedure in an example implementation in which a communication is formed to initiate a function of a physical lock or vehicle.

FIG. 5 is a flow diagram depicting a procedure in an example implementation in which a communication is received via a procedure of FIG. 4 to initiate a function of a physical lock or vehicle.

DETAILED DESCRIPTION

Overview

Figure 1:
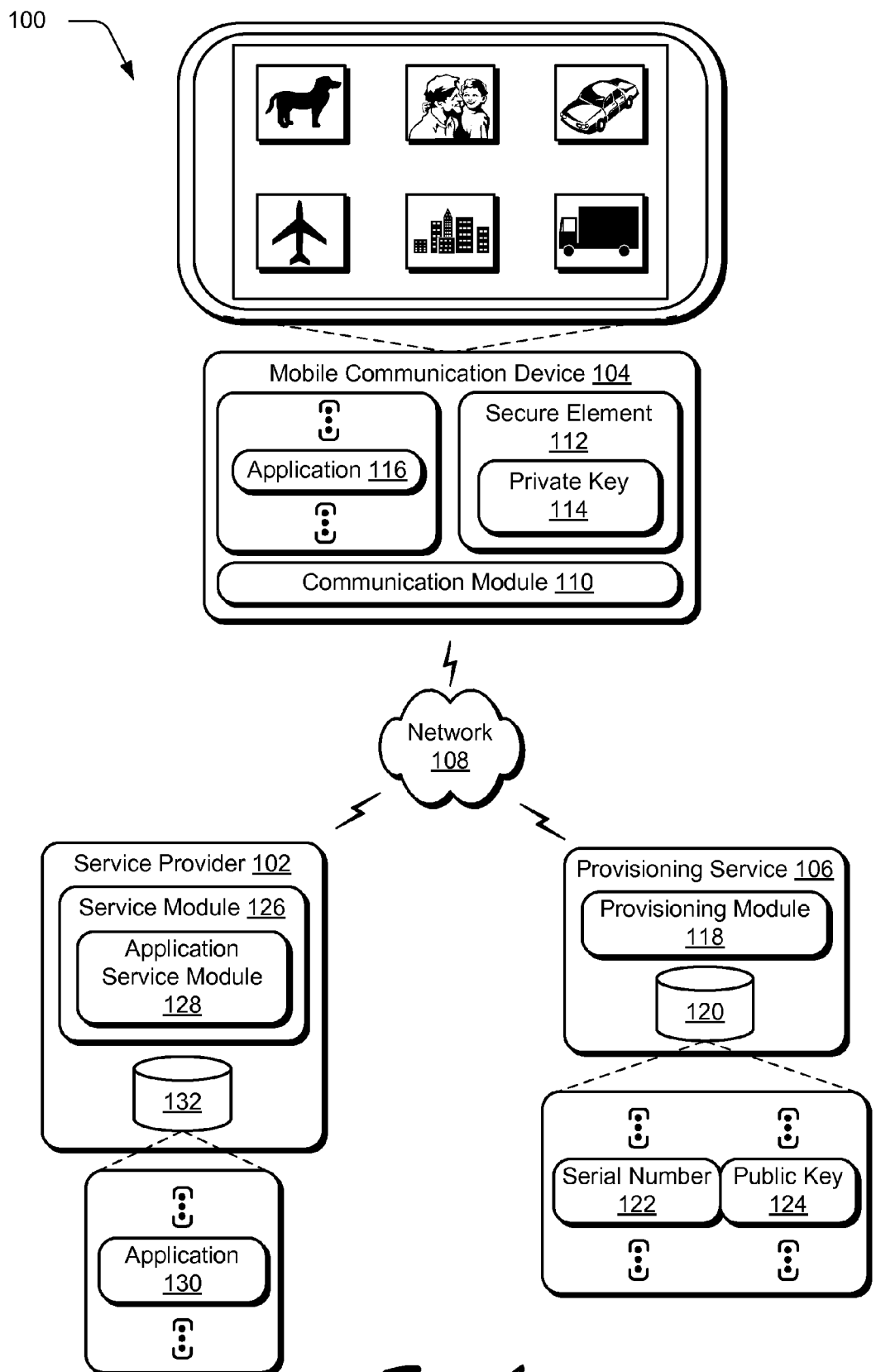
FIG. 1 is an illustration of an example implementation of a mobile communications device in accordance with one or more embodiments of devices, features, and systems for mobile communications.

Although traditional mobile communication devices (e.g., mobile phones) were configured to provide a wide variety of functionality to users, this functionality could be limited by an ability of malicious parties and others to compromise data on the mobile communication device. Therefore, although the mobile communication device was generally considered useful by consumers, the functionality that could be employed by the mobile communication device was not able to reach its true potential.

Techniques are described herein in which data may be securely provisioned and stored by a mobile communication device. These techniques may be leveraged for a variety of purposes. For example, the mobile communication device may be configured to include a secure element that is implemented in hardware to be resistant to tampering, e.g., "snooping" and/or physical removal without breaking. Therefore, data may be stored within the secure element that has a decreased likelihood of being discovered, which may serve to support a wide variety of functionality.

One example of this functionality is an ability to store credentials that are usable to purchase goods or services. For example, the secure element may be configured to answer challenges, provide account information, and so on and thus function as an "eWallet." In this way, a user may utilize the mobile communication device in much the same way as a traditional credit card to purchases goods or services of interest.

The secure element may also support a wide range of additional functionality. For example, the mobile communication device may be configured to act as an "electronic keychain." The secure element, for instance, may be provisioned with credentials that may be used to initiate functioning of a lock, e.g., to lock or unlock a door. A vehicle, for instance, may detect that the mobile communication device is near and challenge the device to provide data sufficient to authorize entry into the vehicle. The mobile communication device may then respond to the challenge using credentials that were provisioned in the secure element. In this way, the mobile communication device may operate to cause operation of physical locks in a variety of different instances, such as vehicles (e.g., cars, planes, boats), premises (e.g., offices, homes, hotel rooms, apartments), lock boxes (e.g., property sales, mailboxes), and so forth. A variety of other examples are also contemplated, further discussion of which may be found in relation to the following figures.

In the following discussion, a variety of example implementations of a mobile communications device having telephone functionality (e.g., a wireless phone) or other multimode wireless communication techniques (e.g., near field technology and Wi-Fi) are described. Additionally, a variety of different functionality that may be employed by the mobile communications device is described for each example, which may be implemented in that example as well as in other described examples. Accordingly, example implementations are illustrated of a few of a variety of contemplated implementations. Further, although a mobile communications device having one or more modules that are configured to provide telephonic functionality are described, a variety of other mobile devices are also contemplated, such as personal digital assistants, mobile music players, dedicated messaging devices, portable game devices, netbooks, and so on.

EXAMPLE IMPLEMENTATIONS

FIG. 1 is an illustration of an example implementation of an environment 100 that is operable to employ the techniques described herein. The environment includes a service provider 102, a mobile communications device 104, and a provisioning service 106 that are illustrated as communicatively coupled, one to another, via a network 108. Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be representative of multiple networks.

The mobile communications device 102 is further illustrated as including a communication module 110. The communication module 110 is representative of functionality of the mobile communications device 102 to communicate via the network 108. For example, the communication module 110 may include telephone functionality to make and receive telephone calls, such as by employing a telephone module to communicate via a plain old telephone service (POTS), wireless network (e.g., cellular and/or Wi-Fi), and so on.

The communication module 110 may also include a variety of other functionality, such as to capture content, form short message service (SMS) text messages, multimedia messaging service (MMS) messages, emails, status updates to be communicated via a social network service or micro-blog, and so on. For instance, the communication module 110 may also support browser functionality to browse the network 108.

The mobile communications device 104 is further illustrated as including a secure element 112. In one or more implementations, the secure element 112 is representative of functionality to support secure communications with the mobile communications device 104. For example, the secure element 112 may be implemented using hardware and configured during manufacture to include a private key 114. For instance, the secure element 112 may be implemented using a tamper-resistant integrated circuit that are resistant to "snooping" as well as physical removal from the mobile communications device 104 by a manufacturer of the device, e.g., by covering a surface-mounted integrated circuit with an epoxy that helps to prevent snooping of the circuit as well as causing the circuit to break if removal is attempted.

In implementations, the secure element 112 includes functionality to perform encryption and/or decryption operations. For example, the secure element 112 may use the private key 114 to perform a decryption operation and expose a result of the operations to other functionality of the mobile communication device 104, such as to one or more applications 116 that are executable by the mobile communications device 104. In this example, the secure element 112 may receive data to be decrypted from the application 116, decrypt the data using the private key 114, and then expose a result of the decryption operation (i.e., the decrypted data) to the application 116. Therefore, inclusion of the private key 114 in the secure element 112 may help to protect the private key 114 from discovery "outside" the secure element 112 by keeping the private key 114 from being exposed "in the clear" during the decryption operation.

A variety of other functionality may also be supported through use of the secure element 112. For example, the secure element 112 may support a protected communication channel through the provisioning service 106. The provisioning service 106, for instance, may include a provisioning module 118 and storage 120. The storage 120 may be used to maintain a serial number 122 assigned to an integrated circuit that includes the secure element 112 and a corresponding public key 124 that forms an asymmetric public/private key pair with the private key 114 of the mobile communications device 104. The provisioning module 118 may thus provide the public key 124 to third-party services such that communication between the third-party service and the mobile communications device 104 is protected, even if that communication occurs using the provisioning service 106 or other service as an intermediary.

For example, a user of the mobile communications device 104 may interact with the communication module 110 or other functionality (e.g., an application 116) to navigate to a service provider 102 over the network 108. The service provider 102 as illustrated includes a service module 126 that is representative of functionality to provide one or more services for access via the network 108.

An example of one of these services is illustrated as an application service module 128. The application service module 128 is representative of functionality to manage dissemination of one or more applications 130 via the network 108. Although the applications 130 are illustrated as stored in storage 132 local to the service provider 102 (e.g., as part of a server farm that implements the service provider 102), the storage 132 may be representative of a wide variety of different types of storage, e.g., third party storage.

In an example, the application service module 138 manages a marketplace configured to provide applications 130 for purchase via the network 108. Therefore, a user of the mobile communication device 104 may access the marketplace to purchase one or more of the applications 130 for download to local storage, which is illustrated as application 116 in this example. To purchase and/or transport the application 130, the mobile communications device 104 and the service provider 102 may utilize secure communications implemented at least in part through use of the secure element 112. The secure communications may be implemented in a variety of ways.

In one instance, the public key 124 is provided to secure communications between the service provider 102 and the mobile communications device 104 directly. For example, the public key 124 may be located by the provisioning module 118 of the provisioning service 106 by obtaining a serial number 122 for the integrated circuit that implements the secure element 112, e.g., from the mobile communications device 104. The provisioning module 118 may then use the serial number 122 to locate the public key 124 and provide the public key 124 to the service provider 102. The public key 124 may then be used to encrypt data to be communicated to the mobile communications device 104, such as the application 130, billing information and other credentials, and so on.

In another instance, the provisioning service 106 provides the public key 124 to the service provider 102 as a basis to support indirect communications, such as to securely transport credentials and other data (e.g., cryptographic keys) that are to be used as a basis to form a communication channel. For example, the service provider 102 may provide credentials (e.g., other cryptographic keys) that are to be used to secure communications between the service provider 102 and the mobile communications device 104. To protect these credentials from compromise by malicious parties, the credentials may be encoded using this public key 124. In other words, the other cryptographic keys may be encrypted using the public key 124 for communication to the mobile communications device 104 to protect the other cryptographic keys from discovery by malicious parties.

In this way, regardless of whether the communication is communicated indirectly via the provisioning service 106 or directly via the network 108, the credentials (e.g., the other cryptographic keys) are protected from discovery through encryption using the public key 124. Therefore, even the provisioning service 106 itself is not able to determine "what" is being communicated between the service provider 102 and the mobile communications device 104.

The mobile communications device 104 may then decrypt the communication using the secure element 112, and more particularly the private key 114, to obtain the other cryptographic keys. A variety of different techniques may then be employed to utilize the other cryptographic keys once decrypted.

In one technique, the other cryptographic keys are exposed for use outside the secure element 112, such as by an application 116 or other functionality of the mobile communications device 104. Thus, in this techniques the secure element 112 is leveraged to provide the credentials that are used to serve as a basis to secure communications but is not used to secure the communications itself, i.e., to provide the actual encryption/decryption.

In another technique, the other cryptographic keys may be kept from being exposed outside the secure element 112 through storage within the secure element 112. The secure element 112 may then use the cryptographic keys as previously described to decrypt and/or encrypt data received by the secure element 112 without exposing the cryptographic keys "outside" the secure element 112. The secure element 112 may thus employ a variety of different techniques to secure communications with the mobile communications device 104, the example of the service provider 102 above being but one of many such examples.

Thus, the secure element 112 may be leveraged to provide a variety of different functionality. For example, the secure element 112 may be utilized to makes purchases of goods or services using credentials that have been securely provisioned therein. The communication module 110, for instance, may include functionality to communicate using near field technology (NFT) with a merchant to purchase a good or service, such as by "tapping" the mobile communication device 104 against a NFT reader of the merchant. Credentials may then be communicated between the mobile communication device 104 and the merchant to perform the purchase, such as credentials similar to those found on a credit card. Thus, the secure element 122 may function as an "eWallet" to store credentials that may be used to purchase goods or services. Other examples are also contemplated, such as indirect communication to make a purchase, such as to communicate via a network 108 with a service provider that performs the transaction using information objected form the mobile communication device 104 and the merchant, further discussion of which may be found in relation to FIG. 2.

Credentials stored within the secure element 112 may also be used for a variety of other purposes. For example, the credentials may be used to verify whether a user of the mobile communication device 104 is permitted access, such as to a vehicle, premises, and so on. Like the purchase techniques described previously, the access techniques may employ the credentials in a variety of ways to verify that access is to be granted or denied, such as to answer a challenge (e.g., process a challenge using a cryptographic key and answer with a result of the processing), compute a unique value, and even communicate the credential itself, further discussion of which may be found beginning in relation to FIG. 2.

Generally, any of the functions described herein can be implemented using software, firmware, hardware (e.g., fixed logic circuitry), or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

The instructions can be stored in one or more computer-readable media. As described above, one such configuration of a computer-readable medium is signal bearing medium and thus is configured to transmit the instructions (e.g., as a carrier wave) to the hardware of the computing device, such as via the network 104. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data. The features of the techniques described below are platform-independent, meaning that the techniques may be implemented on a variety of commercial computing platforms having a variety of hardware configurations.

Figure 2:
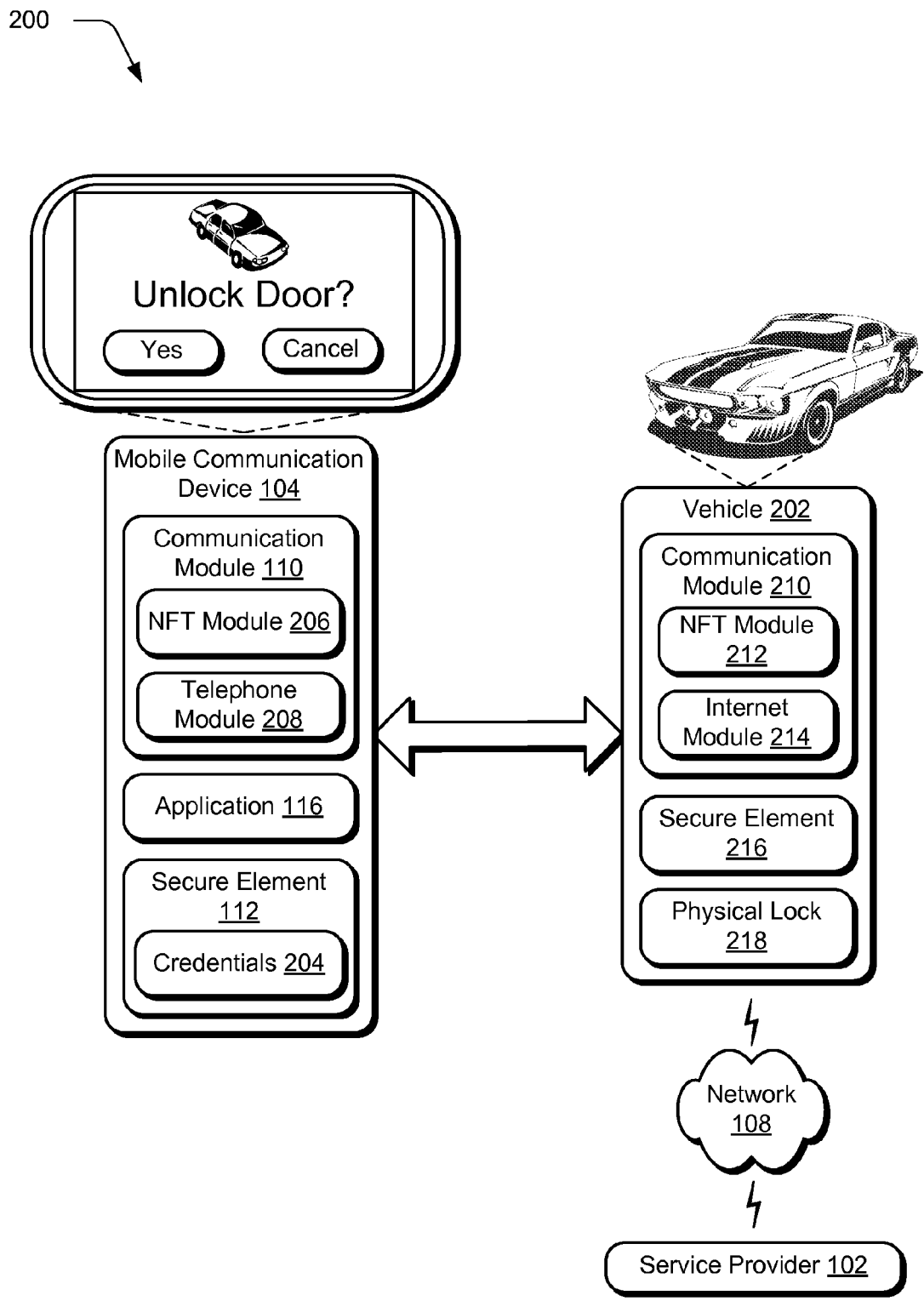
FIG. 2 depicts a system in an example implementation that is configured to implement one or more access techniques in regards to a vehicle.

FIG. 2 depicts a system 200 in an example implementation that is configured to implement one or more access techniques of the mobile communication device 104 of FIG. 1 in regards to a vehicle 202. The mobile communication device 104, as before, includes a communication module 110, a secure element 112 having credentials 204 provisioned therein, and an application 116. The communication module 110 in this example is representative of multimode functionality of the mobile communication device 104 to wirelessly communicate over different networks. The communication module 110 as illustrated includes a near field technology (NFT) module 206 that is representative of functionality to communicate locally using a near field, such as with the vehicle, an NFT reader/writer (e.g., to provision the credentials 204), and so on. The communication module 110 is also illustrated as including a telephone module 206 that is representative of functionality to communicate over a telephone network, such as a wireless telephone (e.g., cellular) network. A variety of other modes of communication are also contemplated, such as Wi-Fi, WiMax, and other communication modes both wired and wireless.

The secure element 112 includes credentials 204 stored therein that are usable to interact with the vehicle 202. For example, the credentials 204 may be provisioned in the secure element 112 as previously described, such as remotely via the network 108 using the private key 114, locally using a NFT reader/writer, and so on. The credentials 204 may be used in a variety of ways to interact with the vehicle 202.

The vehicle 202, for instance, is illustrated as including a communication module 210 that also supports multimode communication, such as a NFT module 212 and an internet module 214, although single mode communication is also contemplated. As before, the NFT module 212 is representative of functionality to communicate using NFT. The internet module 214 is representative of functionality to communicate over the Internet, which is represented by the network 108 in this example system 200.

The vehicle is also illustrated as including a secure element 216, which may or may not contain similar functionality as the secure element 112 previously described in relation to FIG. 1 for the mobile communication device 104. For example, the secure element 216 may be provisioned as previously described in relation to FIG. 1 by a manufacturer, remotely over the network 108 by a service provider 102, and so on.

A physical lock 218 is also illustrated for the vehicle 202 which may be used to control access to the vehicle 202, such as to lock or unlock one or more doors of the vehicle 202. A variety of other functions are also contemplated, such as to turn on headlights of the vehicle 202, remote start of the vehicle 202, automatically open or close doors of the vehicle 202, and so forth. These functions may be initiated by a user of the mobile communication device 104 in a variety of ways.

The user, for instance, may cause the application 116 to be downloaded to the mobile communication device 104 from an application marketplace, communicated locally at a dealership, and so on. The application 116, when executed, may cause the mobile communication device 104 to output a user interface that is configured to initiate one or more functions of the vehicle 202, e.g., after entry of a PIN. In the illustrated instance, the user interface is configured to "Unlock Door" and includes an option (e.g., a display of a "Yes" button) that is selectable via the user interface to initiate the unlocking of the door by the physical lock 218 of the vehicle 202.

The mobile communication device 104, for instance, may communicate data to the vehicle that was generated using the credentials 204 in the secure element 112 to verify that the mobile communication device 104 is authorized to cause the vehicle 202 to perform the functions. The data may be generated in a variety of ways. The credentials 204, for instance, may support a pseudo-random number generator that is configured to output matching pseudo-random numbers of the secure element 216 of the vehicle. Therefore, the data (e.g., the pseudo-random number) may be compared with a pseudo-random number generated by the secure element 216 of the vehicle to see if there is a match, and if so, permit the requested function to be performed.

In another interface, the credentials 204 may involve one or more cryptographic keys. The mobile communication device 104, for instance, may receive a challenge from the vehicle 202, process the challenge using the cryptographic keys, and provide a result of the challenge back to the vehicle 202. The vehicle 202 may then process the result using the secure element 216 to determine whether the credentials 204 of the mobile communication device 104 indicate that the mobile communication device 104 is authorized to initiate functions of the vehicle 202.

The credentials employed by the mobile communication device 104 and the vehicle 202, for instance, may involve a public/private cryptographic key pair for asymmetric encryption/decryption, cryptographic keys for symmetric encryption/decryption, and so on. Although the functionality of the secure element 216 was described as verifying the data received from the mobile communication device 104, this verification may also be distributed. For example, the vehicle 202 may be configured to communicate with the service provider 102 over the network 108 to verify the data received from the mobile communication device 104. Further, although direct wireless communication without an intermediary was discussed to communicate between the mobile communication device 104 and the vehicle 202, indirect communication techniques are also contemplated, such as for both the mobile communication device 104 and the vehicle 202 to communicate with the service provider 102 over the network 108.

These techniques may be used to support a variety of different usage scenarios. For example, a manufacturer of the vehicle 202 may wish to enable a remote keyless entry system based on NFT, which may provide increased security over existing technologies that allow remote key systems to work. Therefore, the manufacturer of the vehicle 202 may include the NFT module 212 within the vehicle 202 to control certain functions of the vehicle 202, such as to start the vehicle, lock or unlock the vehicle, and so on. By including the credentials to perform this function with the secure element 112 of the mobile communication device 104, the user may access the vehicle 202 without a dedicated card, key fob, or even key but rather may simply use the mobile communication device 104 as an "eKeychain." Likewise, these features may be installed as part of an aftermarket modification to provide these features to vehicles that were not originally manufactured to support them.

A user, for instance, may provide physical documents that may be used to verify an identity of the user. A dealership may then provision the credentials 204 in the secure element 112 as previously described in relation to FIG. 1. In an implementation, the credentials 204 are unique to each mobile communication device 104 such that a user may track "who" is accessing the vehicle, may track usage of the vehicle (e.g., in conjunction with GPS) in real time, and so forth. Although these techniques were described as being employed to a vehicle 202, a variety of other examples are also contemplated, such as to control access to a premises, an example of which is described in relation to the following figure.

Figure 3:
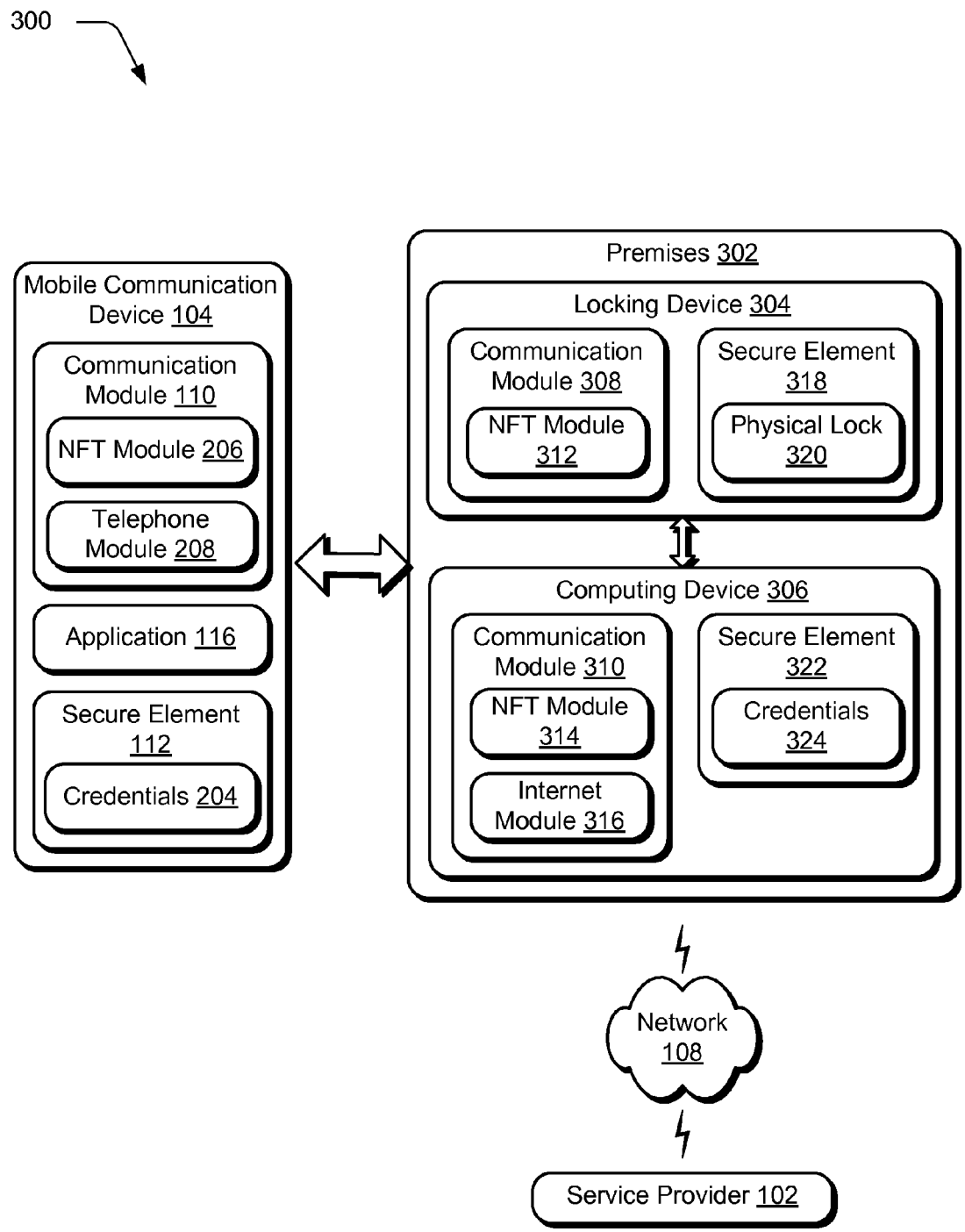
FIG. 3 depicts a system in an example implementation that is configured to implement one or more access techniques in regards to a premises.

FIG. 3 depicts a system in an example implementation that is configured to implement one or more access techniques in regards to a premises. The mobile communication device 104 is illustrated as including functionality as previously described in relation to FIG. 2, which includes a communication module 110 having an NFT module 206 and a telephone module 208, an application 116, and a secure element 112 that maintains credentials 204. The credentials 204 in this case, however, as usable in relation to a premises 302.

The premises 302 in this example is illustrated as a distributed system that includes a locking device 304 and a computing device 306, such as a system that may be employed by a hotel, apartment building, a user's home, and so on. The locking device 304 and the computing device 306 are each illustrated as including a correspond communication module 308, 310 which may be used to support communication between the devices. The communication modules 308, 310 may also be configured to communicate with the mobile communication device 104.

A user, for instance, may enter a hotel and get a room using the purchase techniques of the mobile communication device 104 as previously described in relation to FIG. 1. In response (e.g., to pay for the room, cover damages, give billing information, and so on), the computing device 306 may cause the credentials 204 to be provisioned on the mobile communication device 104, such as by using a NFT module 314, remotely using the service provider 102 and the provisioning service 106 as described in relation to FIG. 1, and so on.

The user may then use the mobile communication device 104 and the provisioned credentials 204 in the secure element 112 to interact with a locking device 304 that is used to control access to the hotel room. The mobile communication device 104, for instance, may communicate with the locking device 304 using respective NFT modules 206, 312 to determine whether access is to be granted.

This determination may be performed in a variety of ways. For example, the locking device 304 may include a secure element 318 that uses credentials provisioned by the computing device 306 to control a physical lock 320. Thus, in this example, this determination may be performed locally between the locking device 304 and the mobile communication device 104 without remote communication. In another example, the computing device 306 may include a secure element 322 that uses credentials 324 to verify the credentials 204 stored in the mobile communication device 104. A variety of other examples are also contemplated, such as to further distribute this verification over the network 108 by using a service provider 102.

Like before, these techniques may be used to support a wide range of different usage scenarios. For instance, the locking device 304 may be configured as a lockbox that includes an NFC reader. A real-estate company that lists a house for sale may provision the lockbox using the provisioning service 106 and permit/deny access based on credentials provisioned in the secure element 112 of the mobile communication device and the lock box. Similar techniques may also be used to control access to apartments, offices, and so on. Further discussion of access techniques may be found in relation to the following procedures.

EXAMPLE PROCEDURES

The following discussion describes account transfer techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 and systems 200, 300 of FIGS. 1-3, respectively.

FIG. 4 depicts a procedure 400 in an example implementation in which a communication is formed to initiate a function of a physical lock or vehicle. A communication is formed having data generated using one or more credentials stored in a secure element of a mobile communication device (block 402). The data, for instance, may be generated using credentials that support a pseudo-random number generator, employ one or more cryptographic keys, and even include the credentials themselves (e.g., a pass code, PIN, and so forth).

Additionally, the communication may be formed responsive to a wide variety of inputs. A user, for instance, may launch the application 116 an interact with a user interface configured to control functions of a vehicle 202 and/or premises 302. In another example, a locking device of the vehicle 202 and/or premises 302 may send out a periodic poll to the mobile communication device 104 such that user interaction to initiate a function (e.g., unlock a car door) is not performed. In other words, the function of unlocking the door and so on may be performed automatically and without user intervention based on a proximity of the mobile communication device 104 to the entity, e.g., within range of a NFT reader of the vehicle 202, premises 302, and so on.

The communication is transmitted wirelessly to initiate function of the physical lock or vehicle (block 404). A variety of different types of wireless communication are contemplated, such as NFT, Wi-Fi, via the Internet, and so on. Thus, the mobile communication device 104 may support multimodal communication to communicate with a vehicle or other entity that employs a physical lock. Further discussion of processing of the communication to perform the function may be found in relation to the following figure.

FIG. 5 depicts a procedure 500 in an example implementation in which a communication is received via the procedure 400 of FIG. 4 to initiate a function of a physical lock or vehicle. Data received wirelessly and directly from a mobile communication device having telephone functionality is verified to determine whether function of a physical lock or vehicle is authorized, the data generated by the mobile communication device using one or more credentials stored within a secure element implemented using tamper-resistant hardware in the mobile communication device (block 502). The vehicle 202, premises 302, and so on, for instance, may receive the data as transmitted by the mobile communication device 104. Further, this communication may be performed directly and thus without an intermediary, e.g., without communicating via the Internet through one or more services.

Responsive to verification that the function is authorized, performance of the function is initiated (block 504) and the function is performed (block 506). As previously stated, a wide variety of functions are contemplated. For example, the functions may relate to a vehicle such as unlocking of a physical lock, locking of a physical lock, opening a door, closing a door, starting the vehicle (e.g., initiating the ignition locally or remotely), turning on lights, and so on. Additionally, the physical lock may be employed by a variety of different devices, such as a lock box, as part of a lock device used for a door (e.g., a premises, a safe), and so on. A wide variety of other functions may also be initiated by leveraging the secure element 112 of the mobile communication device 104 without departing from the spirit and scope thereof.

EXAMPLE DEVICE

Figure 6:
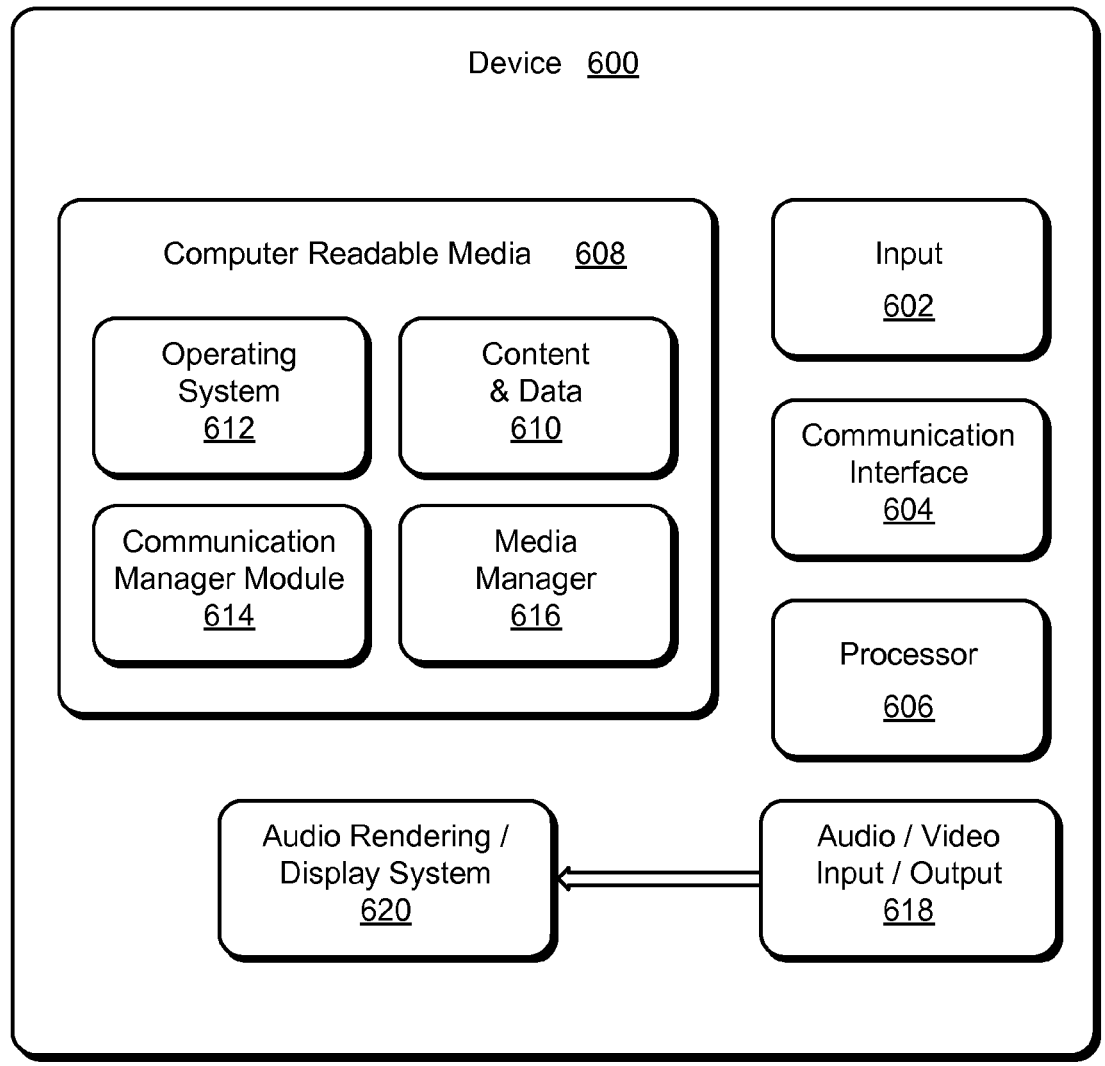
FIG. 6 illustrates various components of an example device that can be implemented in various embodiments as any type of a mobile device to implement embodiments of devices, features, and systems for mobile communications.

FIG. 6 illustrates various components of an example device 600 that can be implemented in various embodiments as any type of a mobile device to implement embodiments of devices, features, and systems for mobile communications. For example, device 600 can be implemented as any of the mobile communications devices described previously. Device 600 can also be implemented to access a network-based service, such as a social network service as previously described.

Device 600 includes input 602 that may include Internet Protocol (IP) inputs as well as other input devices. Device 600 further includes communication interface 604 that can be implemented as any one or more of a wireless interface, any type of network interface, and as any other type of communication interface. A network interface provides a connection between device 600 and a communication network by which other electronic and computing devices can communicate data with device 600. A wireless interface enables device 600 to operate as a mobile device for wireless communications.

Device 600 also includes one or more processors 606 (e.g., any of microprocessors, controllers, and the like) which process various computer-executable instructions to control the operation of device 600 and to communicate with other electronic devices. Device 600 can be implemented with computer-readable media 608, such as one or more memory components, examples of which include random access memory (RAM) and non-volatile memory (e.g., any one or more of a read-only memory (ROM), flash memory, EPROM, EEPROM, etc.).

Computer-readable media 608 provides data storage to store content and data 610, as well as device applications and any other types of information and/or data related to operational aspects of device 600. For example, an operating system 612 can be maintained as a computer application with the computer-readable media 608 and executed on processor 606. Device applications can also include a communication manager module 614 (which may be used to provide telephonic functionality) and a media manager 616.

Device 600 also includes an audio and/or video output 618 that provides audio and/or video data to an audio rendering and/or display system 620. The audio rendering and/or display system 620 can be implemented as integrated component(s) of the example device 600, and can include any components that process, display, and/or otherwise render audio, video, and image data. Device 600 can also be implemented to provide a user tactile feedback, such as vibrate and haptics.

Generally, any of the blocks can be implemented using software, firmware, hardware (e.g., fixed logic circuitry), or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A mobile communication device comprising:
   a processor;
   hardware configured to implement multi-mode wireless communication in which at least one of the modes involves telephone communication;
   tamper-resistant hardware implementing a secure element as storing one or more credentials that include one or more cryptographic keys usable to encrypt or decrypt data, the tamper-resistant hardware including an integrated circuit that is resistant to physical removal from the mobile communication device; and
   memory having instructions stored therein, the instructions being executable by the processor to cause the mobile communication device to perform operations comprising forming a communication having data that was generated using the one or more credentials stored in the secure element, the communication to be transmitted wirelessly using the hardware implementing the multi-mode wireless communication to initiate function of a physical lock or vehicle.

2. A mobile communication device as described in claim 1, wherein the function of the vehicle is to lock or unlock the vehicle, start the vehicle, open a door of the vehicle, or close a door of the vehicle.

3. A mobile communication device as described in claim 1, wherein the function of the physical lock is to permit or deny access to premises.

4. A mobile communication device as described in claim 1, wherein forming of the communication is performed responsive to receipt of an input through execution of an application on the processor of the mobile communication device.

5. A mobile communication device as described in claim 4, wherein the application is downloaded to the mobile communication device from an application marketplace via a network.

6. A mobile communication device as described in claim 1, wherein the communication includes data usable to authorize the function of the physical lock and data that describes the function to be performed by the physical lock or vehicle.

7. A mobile communication device as described in claim 1, wherein the one or more credentials are used to answer a challenge in which a correct answer to the challenge is included in the data to authorize the function of the physical lock or vehicle.

8. A mobile communication device as described in claim 7, wherein the secure element is configured to generate the answer to the challenge without exposing the one or more credentials outside of the secure element.

9. A mobile communication device as described in claim 1, further comprising provisioning the credentials on the secure element of the mobile communication device using a private key to decrypt the credentials without exposing the credentials or the private key outside of the tamper-resistant hardware of the secure element.

10. A mobile communication device as described in claim 1, wherein the communication is configured to be transmitted wirelessly and directly between a device that includes the physical lock and the hardware configured to implement the multi-mode wireless communication without communicating via an Internet.

11. A method comprising:
    provisioning credentials on a secure element implemented in tamper-resistant hardware of a mobile communication device having telephone functionality using a public key to encrypt the credentials for communication to the mobile communication device, the secure element configured to decrypt the encrypted credentials using a corresponding private key stored within the secure element without exposing the credentials or the private key outside of the secure element and the secure element being resistant to physical removal from the mobile communication device; and
    forming a communication for transmission by the mobile communication device that includes data that describes a function to be performed by a vehicle or a physical lock and data generated using the provisioned credentials that is usable to verify that the mobile communication device is authorized to cause the function to be performed.

12. A method as described in claim 11, wherein the function to be performed by the vehicle is to unlock the vehicle, lock the vehicle, cause a door of the vehicle to be open, or cause the door of the vehicle to close.

13. A method as described in claim 11, wherein the communication is configured to be communicated directly between the vehicle and the mobile communication device.

14. A method as described in claim 13, wherein the direct communication does not involve an Internet.

15. A method as described in claim 11, wherein the forming of the communication is performed by the mobile communication device after verification of a PIN entered on the mobile communication device.

* * * * *